(12) United States Patent
Sui et al.

(10) Patent No.: US 12,631,778 B2
(45) Date of Patent: May 19, 2026

(54) METHOD AND SYSTEM FOR DETERMINING A LOCATION OF HYDROCARBON RESERVOIR WITHIN SUBTERRANEAN REGION

(71) Applicant: SAUDI ARABIAN OIL COMPANY, Dhahran (SA)

(72) Inventors: Yuhan Sui, Beijing (CN); Yue Ma, Beijing (CN); Hongwei Liu, Dhahran (SA); Dongliang Zhang, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 462 days.

(21) Appl. No.: 18/254,764

(22) PCT Filed: Feb. 3, 2023

(86) PCT No.: PCT/CN2023/074355

§ 371 (c)(1),
(2) Date: May 26, 2023

(87) PCT Pub. No.: WO2024/159507

PCT Pub. Date: Aug. 8, 2024

(65) Prior Publication Data

US 2024/0353584 A1 Oct. 24, 2024

(51) Int. Cl.
*G01V 1/34* (2006.01)
*G01V 1/28* (2006.01)
(Continued)

(52) U.S. Cl.
CPC .............. *G01V 1/345* (2013.01); *G01V 1/282* (2013.01); *G01V 1/301* (2013.01); *E21B 7/04* (2013.01);
(Continued)

(58) Field of Classification Search
CPC ....... E21B 2200/20; E21B 7/04; G01V 1/282; G01V 1/345; G01V 1/301; G01V 2210/645
See application file for complete search history.

(56) References Cited

U.S. PATENT DOCUMENTS 9,971,051 B2 5/2018 Wu
11,391,856 B2 * 7/2022 Al Ibrahim ............ G01V 1/282
(Continued)

FOREIGN PATENT DOCUMENTS

CN 105474048 A 4/2016
CN 106932824 A 7/2017
(Continued)

OTHER PUBLICATIONS

International Search Report issued in PCT/CN2023/074355 on Apr. 7, 2023 (5 pages).
(Continued)

*Primary Examiner* — Elias Desta
(74) *Attorney, Agent, or Firm* — Osha Bergman Watanabe & Burton LLP

(57) ABSTRACT

A system and methods are disclosed. The method includes obtaining a seismic dataset including a plurality of recorded multiple events, generating a predicted multiple model using a multiple prediction method and the seismic dataset, and estimating a set of initial matching filters using a matching method, to match the plurality of estimated and recorded multiple events. The method further includes generating a tensor field based on the predicted multiple model, determining a set of structure-oriented matching filters based on the set of initial matching filters and the tensor field, generating a filtered multiple model based on the predicted multiple model and the set of structure-oriented matching filters, and generating a multiple-attenuated seismic dataset based on the filtered multiple model and the seismic dataset,
(Continued)

500

502 — Obtain a seismic dataset for a subterranean region, where the seismic dataset comprises a plurality of recorded multiple events.

504 — Generate a predicted multiple model using a multiple prediction method and the seismic dataset, where the predicted multiple model comprises a plurality of predicted multiple events.

506 — Estimate a set of initial matching filters using a matching method, where the set of initial matching filters matches the plurality of predicted multiple events to the plurality of recorded multiple events.

508 — Generate a tensor field based, at least in part, on the predicted multiple model.

510 — Determine a set of structure-oriented matching filters based, at least in part, on the set of initial matching filters and the tensor field.

512 — Generate a filtered multiple model based, at least in part, on the predicted multiple model and the set of structure-oriented matching filters, where the filtered multiple model comprises a plurality of estimated multiple events 514 — Generate a multiple-attenuated seismic dataset based, at least in part, on the filtered multiple model and the seismic dataset.

516 — Form a seismic image based, at least in part, on the multiple-attenuated seismic dataset.

518 — Determine a location of a hydrocarbon reservoir within the subterranean region based, at least in part, on the seismic image.

forming a seismic image based, at least in part, on the multiple-attenuated seismic dataset, and determining a location of a hydrocarbon reservoir based on the seismic image.

20 Claims, 8 Drawing Sheets

(51) Int. Cl.
*G01V 1/30* (2006.01)
*E21B 7/04* (2006.01)

(52) U.S. Cl.
CPC .... *E21B 2200/20* (2020.05); *G01V 2210/645* (2013.01)

(56) References Cited

U.S. PATENT DOCUMENTS

| | | | | |
|---|---|---|---|---|
| 11,693,140 | B2 * | 7/2023 | Tawil | G06N 3/09 |
| | | | | 706/12 |
| 12,282,128 | B2 * | 4/2025 | Widatalla | G01V 1/306 |
| 2013/0194893 | A1 | 8/2013 | Nagarajappa | |
| 2017/0123090 | A1 | 5/2017 | Khalil et al. | |
| 2023/0037886 | A1 | 2/2023 | He et al. | |

FOREIGN PATENT DOCUMENTS

| | | |
|---|---|---|
| CN | 113219535 A | 8/2021 |
| CN | 113687417 A | 11/2021 |
| WO | 2016/154404 A1 | 9/2016 |

OTHER PUBLICATIONS

Written Opinion of the International Searching Authority issued in PCT/CN2023/074355 on Apr. 7, 2023 (3 pages).

Y. Wang, "Multiple subtraction using an expanded multichannel matching filter," Geophysics, vol. 68, No. 1, pp. 346-354, 2003 (9 pages).

S. Fomel, "Adaptive multiple subtraction using regularized nonstationary regression," Geophysics, vol. 74, No. 1, pp. V25-V33, 2009 (9 pages).

D. Hale, "Structure-oriented smoothing and semblance." CWP report, vol. 635, No. 635, 2009 (10 pages).

D.Hale, "Structure-oriented bilateral filtering of seismic images" SEG Technical Program Expanded Abstracts, 2011 (5 pages).

D. Donno, "Improving multiple removal using least-squares dip filters and independent component analysis" Geophysics, vol. 76, No. 5, pp. V91-V104, 2011 (14 pages).

Joost van der Neut et al. "Adaptive overburden elimination with the multidimensional Marchenko equation" Geophysics, vol. 81, No. 5, P. T265-284, Sep.-Oct. 2016 (14 pages).

Jakubowicz H. "Wave equation prediction and removal of interbed multiple" 68th Annual International Meeting, SEG, Expanded Abstracts, 1527-1530 (1998) (4 pages).

* cited by examiner

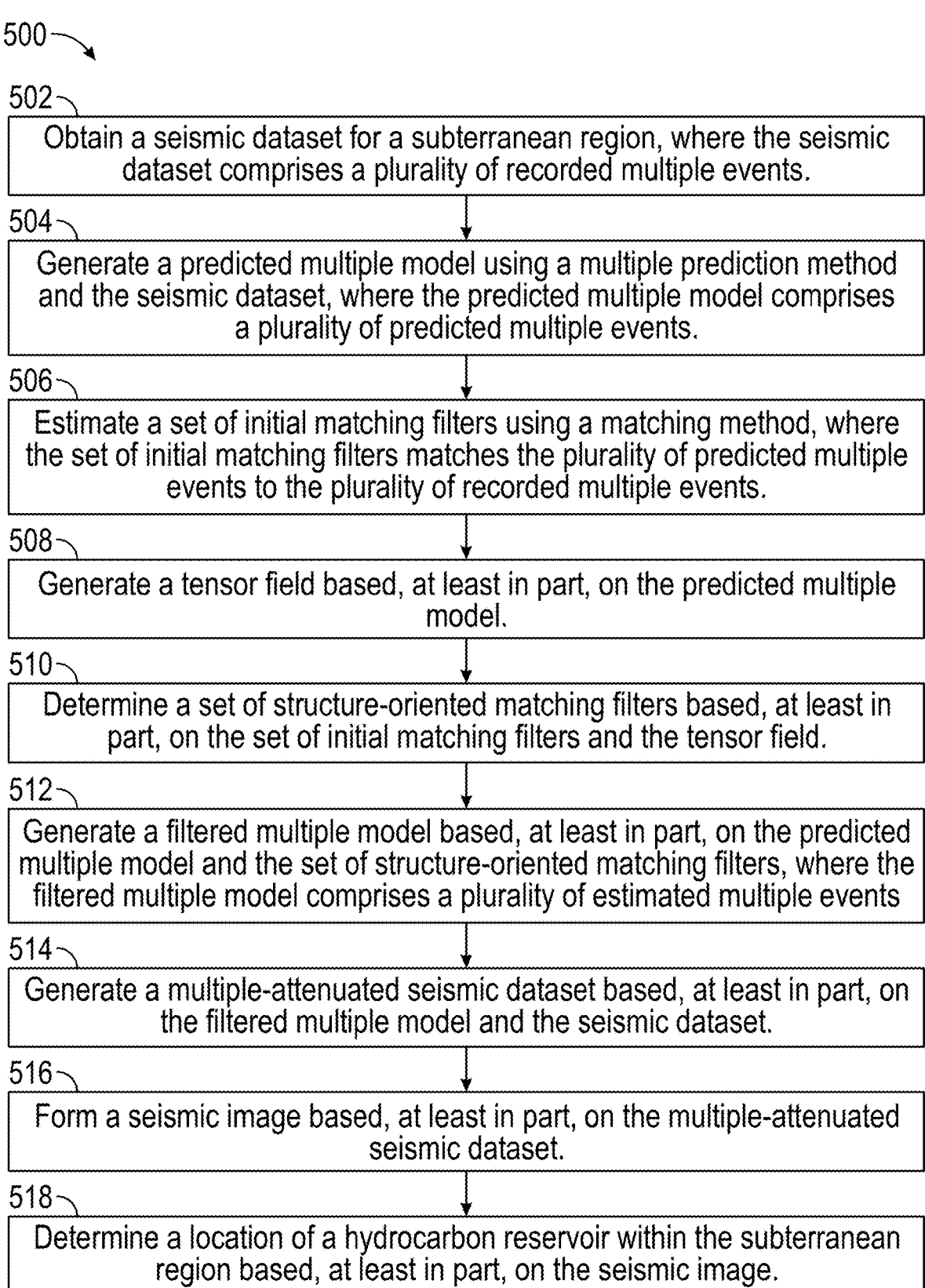

500

502
Obtain a seismic dataset for a subterranean region, where the seismic dataset comprises a plurality of recorded multiple events.

504
Generate a predicted multiple model using a multiple prediction method and the seismic dataset, where the predicted multiple model comprises a plurality of predicted multiple events.

506
Estimate a set of initial matching filters using a matching method, where the set of initial matching filters matches the plurality of predicted multiple events to the plurality of recorded multiple events.

508
Generate a tensor field based, at least in part, on the predicted multiple model.

510
Determine a set of structure-oriented matching filters based, at least in part, on the set of initial matching filters and the tensor field.

512
Generate a filtered multiple model based, at least in part, on the predicted multiple model and the set of structure-oriented matching filters, where the filtered multiple model comprises a plurality of estimated multiple events 514
Generate a multiple-attenuated seismic dataset based, at least in part, on the filtered multiple model and the seismic dataset.

516
Form a seismic image based, at least in part, on the multiple-attenuated seismic dataset.

518
Determine a location of a hydrocarbon reservoir within the subterranean region based, at least in part, on the seismic image.

804
| Seismic acquisition system |

806
| Seismic processing system |

808
| Seismic interpretation workstation |

750
| Wellbore planning system |

700
| Drilling system |

930
Network

902
Computer

Interface
904

905 Processor

907 Application

912 API

913 Service Layer

903

Memory

906

METHOD AND SYSTEM FOR DETERMINING A LOCATION OF HYDROCARBON RESERVOIR WITHIN SUBTERRANEAN REGION

BACKGROUND

In the oil and gas industry, seismic surveying is commonly used to investigate subterranean structure, and subsequently in the evaluation and location of oil and gas reservoirs. In seismic surveys, a seismic source generates seismic waves which propagate through the subterranean region. The seismic waves reflect and refract from subterranean structure and are subsequently detected by seismic receivers. Recorded seismic waves that have been reflected once from a seismic reflector are called "primary events," or simply "primaries."

However, in addition to primaries, seismic data frequently includes recorded seismic waves that have been reflected multiple times. That is, seismic data may include seismic waves that have been reflected upward from a first seismic reflector, then reflected downward from a second seismic reflector at a shallower depth than the first seismic reflector, and then reflected upward from a third seismic reflector at a deeper depth than the second seismic reflector. Recorded seismic waves of this type are termed "multiple events," or simply "multiples."

Seismic processing frequently assumes seismic data is composed of primary events. If multiples are processed under the erroneous assumption that they are primaries, fictious reflectors may appear in the resulting seismic image, and/or real seismic reflectors may be masked or blurred as a result of the multiples in the seismic image. It is therefore desirable to remove multiple energy from seismic data as part of the processing flow.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes obtaining a seismic dataset for a subterranean region, where the seismic dataset comprises a plurality of recorded multiple events, generating a predicted multiple model using a multiple prediction method and the seismic dataset, where the predicted multiple model comprises a plurality of estimated multiple events, and estimating a set of initial matching filters using a matching method, where the set of initial matching filters matches the plurality of estimated multiple events to the plurality of recorded multiple events. The method further includes generating a tensor field based, at least in part, on the predicted multiple model, determining a set of structure-oriented matching filters based, at least in part, on the set of initial matching filters and the tensor field, and generating a filtered multiple model based, at least in part, on the predicted multiple model and the set of structure-oriented matching filters. The method still further includes generating a multiple-attenuated seismic dataset based, at least in part, on the filtered multiple model and the seismic dataset, forming a seismic image based, at least in part, on the multiple-attenuated seismic dataset, and determining a location of a hydrocarbon reservoir within the subterranean region based, at least in part, on the seismic image.

In general, in one aspect, embodiments relate to a non-transitory computer-readable medium. The non-transitory computer-readable medium having computer-executable instructions stored thereon that, when executed by a processor, perform steps including a seismic dataset for a subterranean region, where the seismic dataset comprises a plurality of recorded multiple events, generating a predicted multiple model using a multiple prediction method and the seismic dataset, where the predicted multiple model comprises a plurality of estimated multiple events, and estimating a set of initial matching filters using a matching method, where the set of initial matching filters matches the plurality of estimated multiple events to the plurality of recorded multiple events. The steps further includes generating a tensor field based, at least in part, on the predicted multiple model, determining a set of structure-oriented matching filters based, at least in part, on the set of initial matching filters and the tensor field, and generating a filtered multiple model based, at least in part, on the predicted multiple model and the set of structure-oriented matching filters. The steps still further includes generating a multiple-attenuated seismic dataset based, at least in part, on the filtered multiple model and the seismic dataset, forming a seismic image based, at least in part, on the multiple-attenuated seismic dataset, and determining a location of a hydrocarbon reservoir within the subterranean region based, at least in part, on the seismic image.

In general, in one aspect, embodiments relate to a system. The system includes a seismic acquisition system, a seismic processing system, and a seismic interpretation workstation. The seismic acquisition system is configured to record a seismic dataset for a subterranean region, where the seismic dataset comprises a plurality of recorded multiple events. The seismic processing system is configured to receive the seismic dataset, generate a predicted multiple model using a multiple prediction method and the seismic dataset, where the predicted multiple model comprises a plurality of estimated multiple events, and estimate a set of initial matching filters using a matching method, wherein the set of initial matching filters matches the plurality of estimated multiple events to the plurality of recorded multiple events. The seismic processing system is further configured to generate a tensor field based, at least in part, on the predicted multiple model, determine a set of structure-oriented matching filters based, at least in part, on the set of initial matching filters and the tensor field, and generate a filtered multiple model based, at least in part, on the predicted multiple model and the set of structure-oriented matching filters. The seismic processing system is still further configured to generate a multiple-attenuated seismic dataset based, at least in part, on the filtered multiple model and the seismic dataset, and form a seismic image based, at least in part, on the multiple-attenuated seismic dataset. The seismic interpretation workstation is configured to determine a location of a hydrocarbon reservoir within the subterranean region based, at least in part, on the seismic image.

Other aspects and advantages of the claimed subject matter will be apparent from the following description and the appended claims.

BRIEF DESCRIPTION OF DRAWINGS

Specific embodiments of the disclosed technology will now be described in detail with reference to the accompa-

Figure 1:
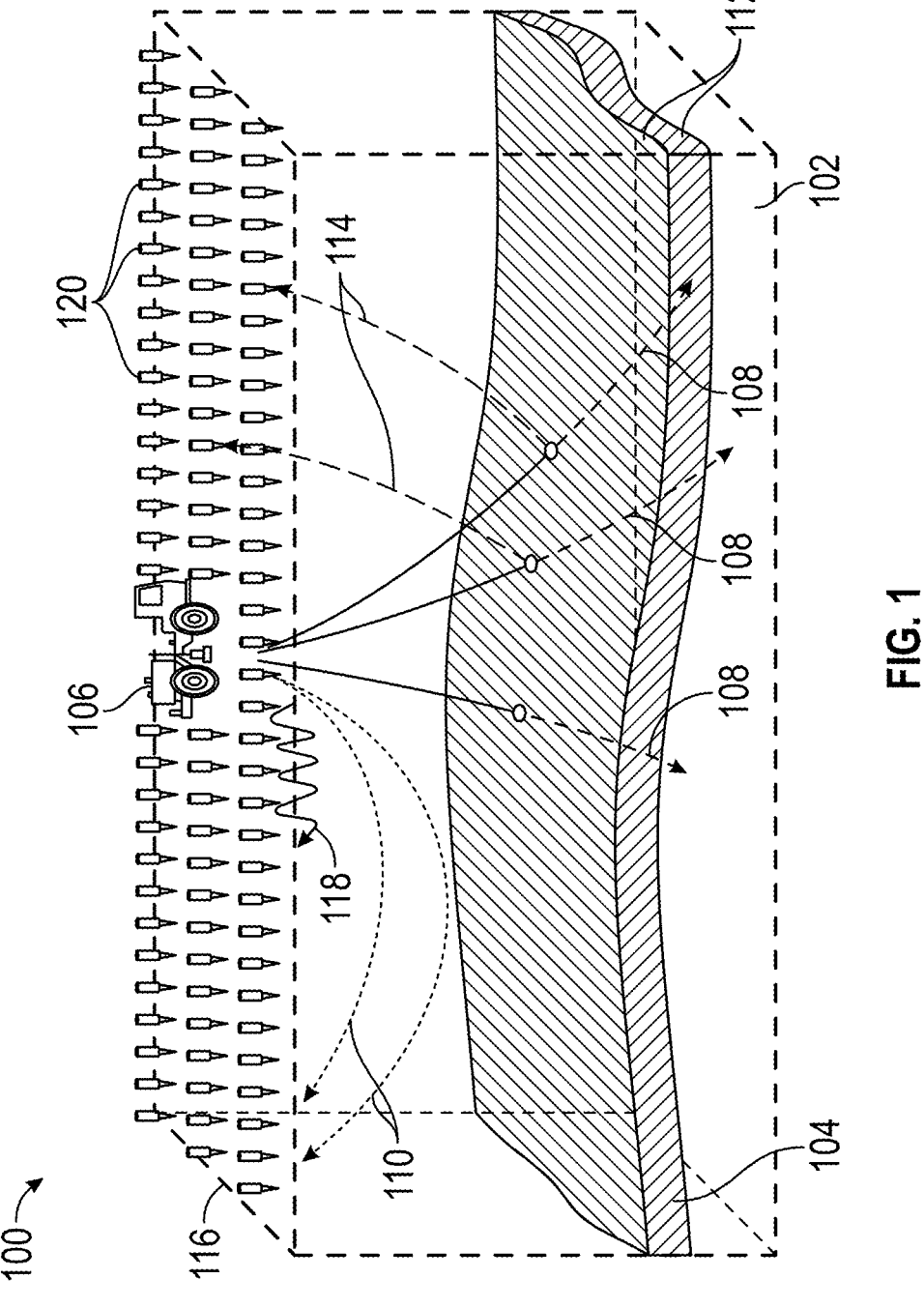

3 nying figures. Like elements in the various figures are denoted by like reference numerals for consistency.

FIG. 1 shows an example of a seismic survey in accordance with one or more embodiments.

Figure 2B:
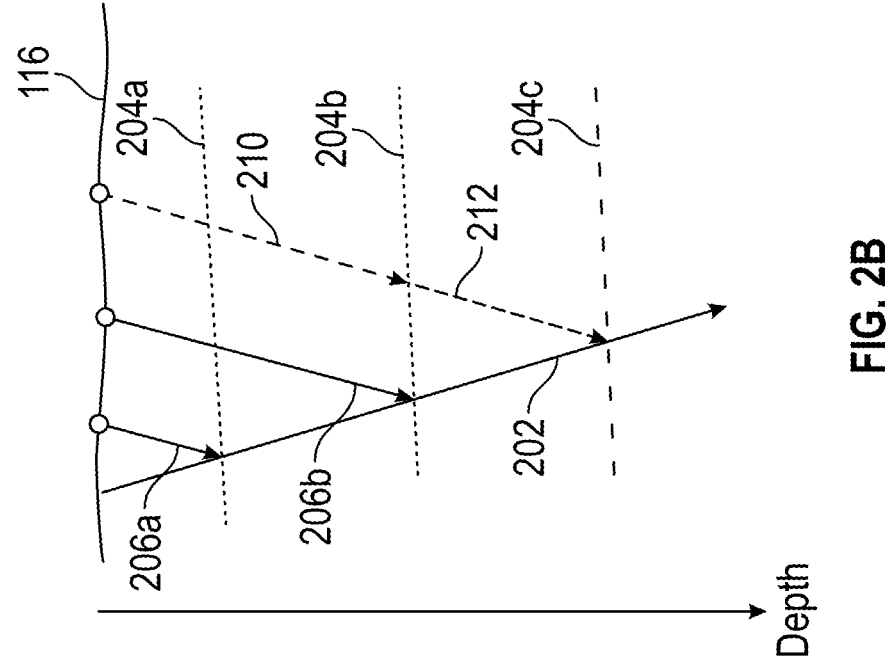
Figure 2A:
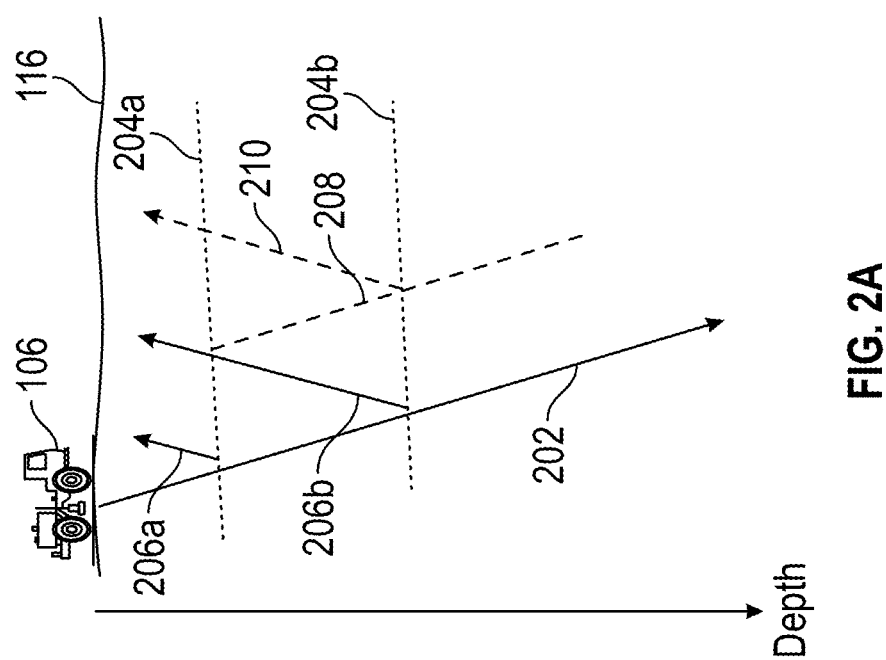

FIGS. 2A and 2B show schematic representations of seismic ray-paths in accordance with one or more embodiments.

Figure 3B:
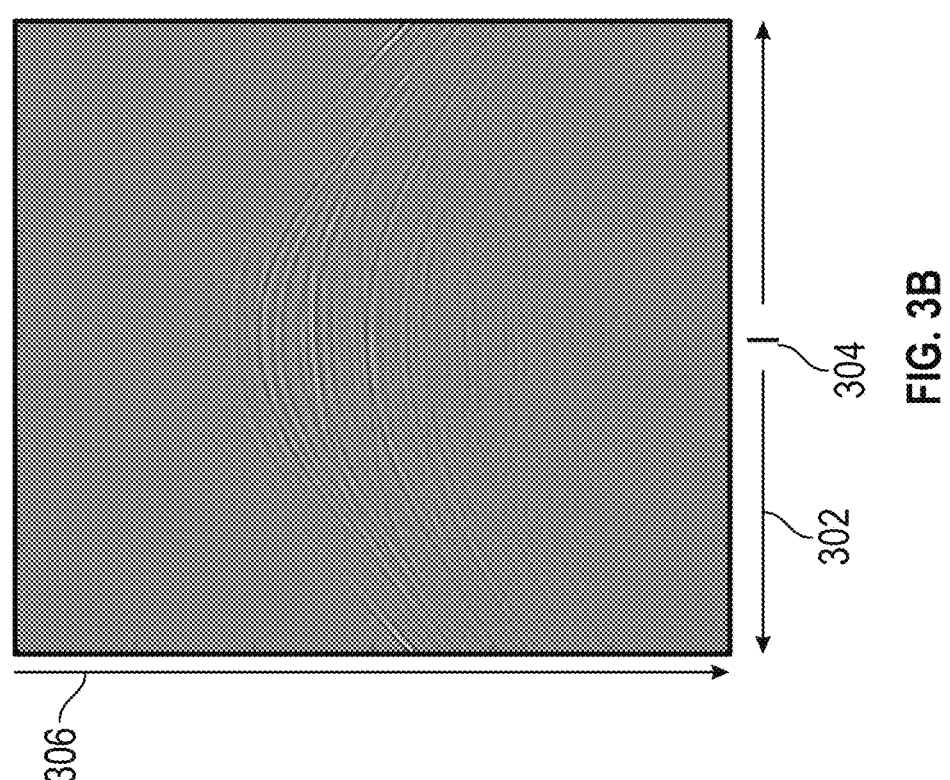
Figure 3A:
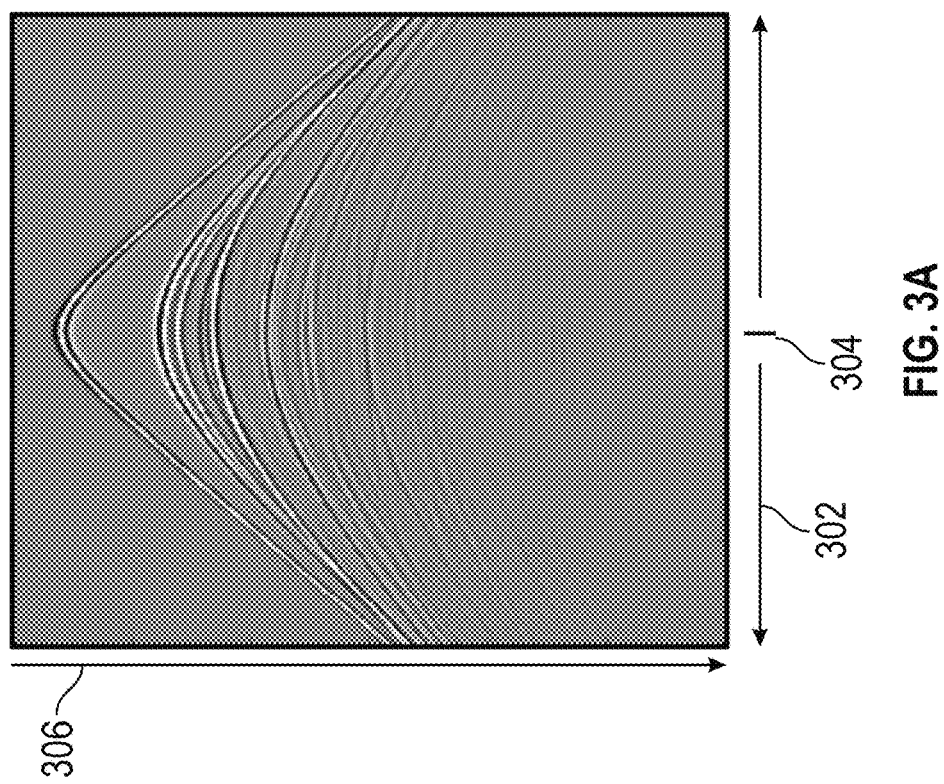

FIGS. 3A and 3B show examples of seismic data in accordance with one or more embodiments.

Figures 4A, 4B:
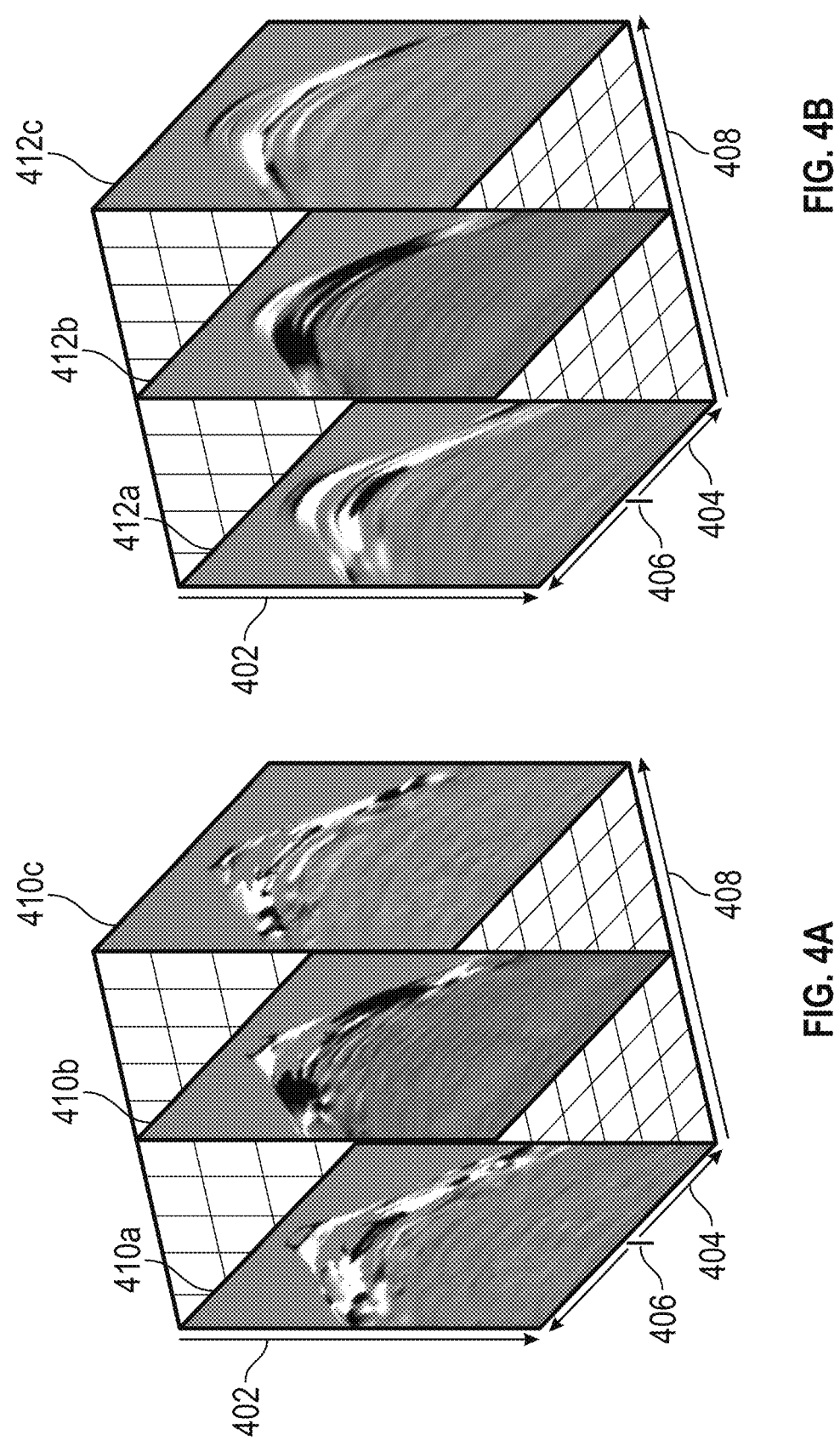

FIGS. 4A and 4B show examples of matching filters in accordance with one or more embodiments.

FIG. 5 shows a flowchart in accordance with one or more embodiments.

FIGS. 6A-6D show examples of seismic data in accordance with one or more embodiments.

Figure 7:
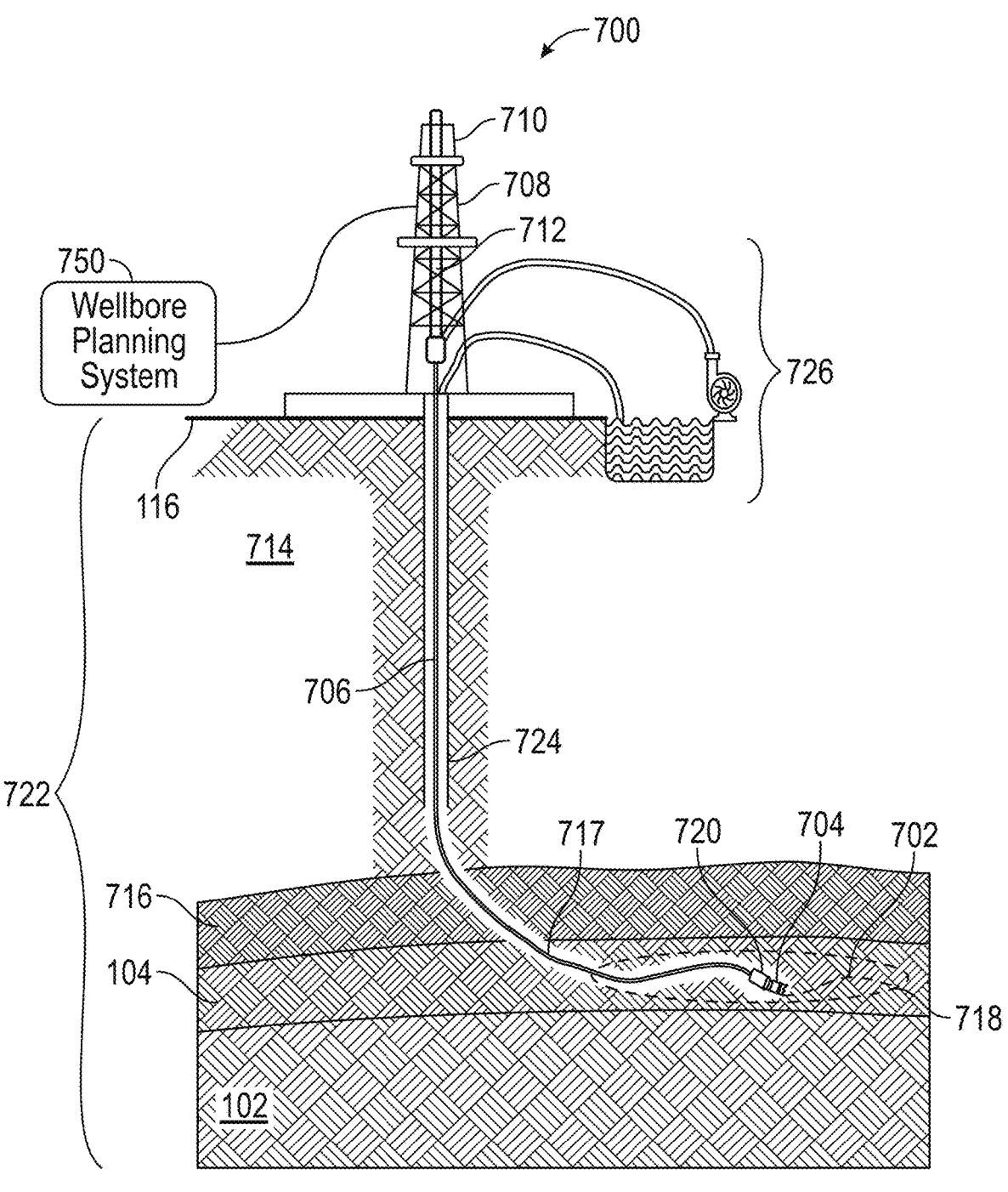

FIG. 7 shows a drilling system in accordance with one or more embodiments.

Figures 8, 9:
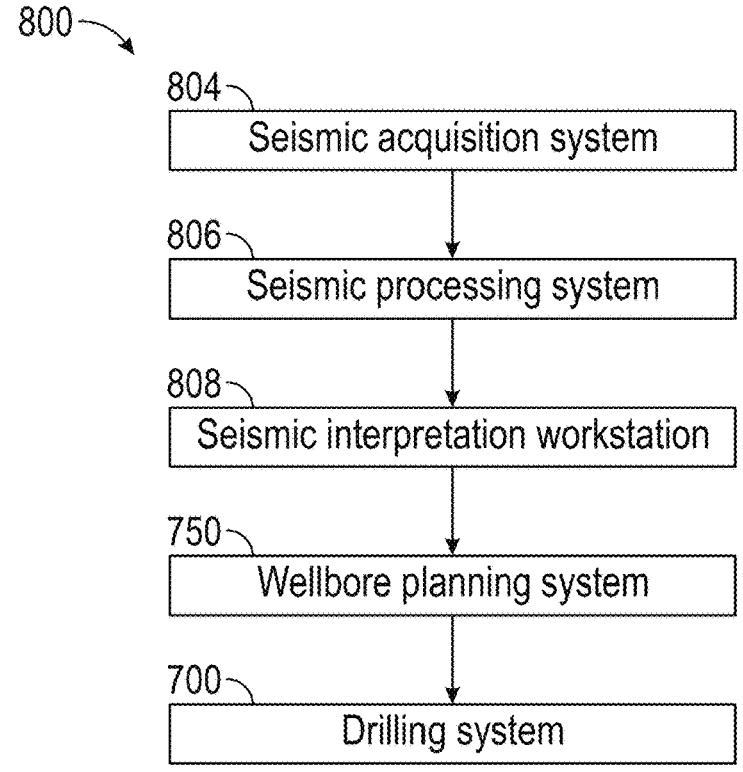

FIG. 8 shows a block diagram of systems in accordance with one or more embodiments.

FIG. 9 shows a computer system in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-9, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic trace" includes reference to one or more of such seismic traces.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims may not be introduced, it would be apparent to one of ordinary skill that the subject matter of the dependent claims directed to one or more embodiments may be combined with other dependent claims.

Seismic multiple removal or attenuation is an important step in the seismic processing flow. Some multiple attenuation methods predict the multiple energy content in a recorded seismic dataset, then subtract the predicted multiple model. While advancements are continually being made in the field of multiple attenuation, many focus on the improvement of multiple energy prediction methods; however, the challenge remains in the removal of the predicted multiple. Typically, the predicted multiple energy does not represent the recorded multiple energy, and thus the predicted multiple energy must be adapted to the recorded multiple energy before subtraction. Conventional methods may estimate a set of matching filters that adapt the predicted multiple model to the recorded seismic data before subtraction; however, the methods for estimating matching filters may be flawed or limited. For example, these conventional methods may result in the removal of primary energy or may leave multiple energy intact, particularly in areas where primary energy and multiple energy overlap. This pitfall may be avoided by considering the structural differences between multiple energy and primary energy. The present disclosure proposes constraining the estimated matching filters using structural smoothing in order to reduce primary energy loss and increase multiple energy removal, especially in these overlap areas.

Removing multiple energy while preserving primary energy is critical to producing a reliable seismic image, which is considered an integral component in hydrocarbon exploration and recovery. Seismic interpretation is a task that is routinely performed today, where attributes from the seismic image are analyzed and measured to facilitate the location of new hydrocarbon reservoirs and the maximization of hydrocarbon recovery in known reservoirs.

Disclosed are embodiments that improve the subtraction of multiple energy, specifically improving the matching filters generated during the adaptive subtraction process. Structurally-oriented matching filters may improve the multiple subtraction result by better preserving primary energy and more effectively attenuating multiple compared to traditional least-square matching filters. The results shown and discussed later in FIGS. 6A-6D indicate a demonstrable improvement over existing methods. A multiple-attenuated seismic dataset is then used to form a seismic image used in hydrocarbon exploration and production. In addition, methods are disclosed for determining and drilling wellbore paths based on the seismic image.

Note that a person of ordinary skill in the art may use "subsurface" and "subterranean" synonymously. Herein, we follow this practice and the terms subsurface and subterranean may be used interchangeably as appropriate without departing from the scope of the present disclosure.

FIG. 1 shows an example of a seismic survey (100) of a subterranean region (102) containing a hydrocarbon reservoir (104). The seismic survey (100) may use a seismic acquisition system to generate and record seismic data. The seismic acquisition system may include one or more seismic sources (106) that generate radiated seismic waves (108). In a land environment, the seismic source (106) may be a dynamite source or one or more seismic vibrators (e.g., a "vibroseis truck"). In a marine or lacustrine environment, the seismic source (106) may be an air gun. The seismic acquisition system may also include a plurality of seismic receivers (120), by which the radiated seismic waves may be recorded. A single activation of the seismic source (106) may be recorded by tens or hundreds of thousands of seismic receivers (120). Typically, in a land environment, the seismic receiver may record the velocity or acceleration of ground motion, while in a marine or lacustrine environment, the seismic receiver may record pressure fluctuations caused by the seismic waves.

The radiated seismic waves (108) may propagate along the ground surface (116) as surface seismic waves (118). The radiated seismic waves (108) may also propagate below the surface (116) and return as refracted seismic waves (110) or may be reflected one or more times by geological discontinuities (112) and return to the surface as reflected seismic waves (114). In general, radiated seismic waves (108), surface seismic waves (118), refracted seismic waves (110), and reflected seismic waves (114), may be referred to as simply "seismic waves."

In some embodiments, the seismic waves generated by a single activation of the seismic source (106) are recorded by the seismic receivers (120) as a time-series representing the amplitude of ground-motion at a sequence of discrete times. This time-series may be denoted a seismic "trace." In other embodiments, the seismic waves generated by a plurality of activations of the seismic source (106) at a single location may be recorded by each seismic receiver (120) and combined, summed, or "stacked" to form a seismic trace. Further, a series of adjacent traces may exhibit a coherent pattern from a recorded wave response of a geological discontinuity (112) and may be referred to as a seismic "event." For example, the seismic event may represent a recorded reflected wave.

The seismic receivers (120) are positioned at a plurality of seismic receiver locations which we may denote $(x_r, y_r)$ where x and y represent orthogonal axes on the surface (116) of the Earth above the subterranean region (102). Thus, the refracted seismic waves (110), surface seismic waves (118), and reflected seismic waves (114) generated by a single activation of the seismic source (106) may be represented as a three-dimensional "3D" volume with axes $D(t, x_r, y_r)$, where $(x_r, y_r)$ represents the location of the seismic receiver (120) and t denotes the time-series at which the amplitude of ground-motion was measured. However, a seismic survey (100) may include recordings of seismic waves generated by a seismic source (106) that is positioned at a plurality of seismic source locations denoted $(x_s, y_s)$. Thus, the seismic volume for a seismic survey (100) may be represented as a five-dimensional volume, denoted $D(t, x_r, y_r, x_s, y_s)$, where $(x_r, y_r)$ are vectors of seismic receiver locations along the x- and y-axes, and $(x_s, y_s)$ are vectors of seismic source locations along the x- and y-axes.

The data collected by the seismic receivers (120) is referred to as a seismic dataset. A seismic dataset must be processed to produce valuable information, such as one or more seismic images or one or more seismic attributes. Seismic processing may be done using a seismic processing system and seismic processing typically includes subcategories such as pre-processing, noise attenuation, near-surface corrections, velocity analysis, imaging, and attribute generation.

Pre-processing may include sorting (e.g., "demultiplexing") and organizing the data (e.g., "sorting") including integrating the seismic data with geometry and navigation data describing the locations of seismic sources and receivers at the time the seismic data was recorded. The seismic dataset may be sorted and grouped into "gathers" such as common shot or common receiver gathers, according to the spatial coordinates of seismic sources (106) and receivers (120), respectively. In some embodiments, the seismic volume may be sorted and grouped based on a common domain, such as a common midpoint $$(x_m, y_m) = \frac{(x_s, y_s) + (x_r, y_r)}{2},$$

where $(x_s, y_s)$ corresponds to a position of a seismic source (106) location, and $(x_r, y_r)$ corresponds to a position of a seismic receiver (120).

A process called "stacking" typically involves summing adjacent traces within a common midpoint (CMP) gather. Stacking is commonly performed after applying moveout correction, which is a process that compensates for the delay in reflection arrival times caused by variations in offset (the distance between source (106) and receiver (120) locations). Before stacking, the dataset is referred to as a "pre-stack" seismic dataset, whereas once the CMP gathers (or any form of gathers) are stacked, the dataset is called a "post-stack" seismic dataset. Another example of a common domain is the common offset domain, where offset= $\sqrt{(x_s-x_r)^2+(y_s-y_r)^2}$.

Further, pre-processing may include removing recordings from malfunctioning receivers ("trace editing"), seismic wavelet estimation, correcting amplitudes for geometrical-spreading effects, and deconvolution (e.g., "predictive deconvolution") to remove undesirable ringing caused by the recording system or the layered structure of the earth.

Seismic noise may include both coherent source-generated and random noise. For example, coherent source-generated may include ground- and mud-roll and both short- and long-period multiple reverberation from the earth. Random noise may include wind or ocean-swell induced noise, anthropogenic noise from nearby machinery (e.g., pumps) or traffic, and may include interference from seismic surveys being conducted in adjacent areas. Noise attenuation may include high-cut filtering of high-frequency noise, removal of surface seismic waves ("ground-roll") and other linear-propagating noise using frequency-wavenumber (e.g., "f-k" or "tau-p") filtering, and multiple attenuation. Multiple identification and attenuation will be described further in FIGS. 2A and 2B.

Near-surface corrections may include correcting for "ghosts" (e.g., de-ghosting) caused by the proximity of the surface of the earth or sea surface to the seismic sources and receivers, and for near-surface seismic wave propagation velocity and attenuation effects (e.g., "statics correction").

Acquisition regularization may include compensating for irregularities in spatial sampling during seismic data acquisition. Obstacle avoidance, economics and other external factors may affect the trace spacing across a seismic survey.

Acquisition regularization includes basic or advanced interpolation techniques to create uniformly sampled seismic data from irregularly-acquired seismic data.

In order to determine the correct location of reflectors within the subsurface and generate images of geological structure and seismic attributes, it is necessary to determine the seismic wave propagation velocity (a "velocity model") at points within the subsurface region of interest. A velocity model may be determined from in-situ measurements, i.e., in a wellbore and/or from the seismic data itself using a process called "velocity analysis." Various velocity analysis methods are available each with their own computational cost and accuracy characteristics. Velocity analysis may include processes such as "normal-moveout estimation," "tomography," and "full waveform inversion," or frequently, a combination of these methods all of which are familiar to a person of ordinary skill in the art.

Once a velocity model has been determined, an image of seismic wave reflection or scattering may be determined using a method termed "migration." As with velocity analysis, there are various methods of migration familiar to a person of ordinary skill in the art, each with its own computation cost and accuracy characteristics. For example, in order of increasing cost and accuracy, migration methods include Kirchhoff time migration, Kirchhoff depth migration, reverse-time migration (RTM), and least-squares revers-time migration (LSRTM). In each case a migration method aims to position a signal recorded by a seismic receiver at the location in the surface from which it was scattered or reflected.

Seismic processing may produce a number of 3D images from the seismic data representing different "attributes" of the seismic data. For example, an image of the total amplitude of scattering at each point in the subsurface may be generated. Similarly, the amplitude of scattering within a restricted range of angles may be calculated. Alternatively, the mean, median or mode of the spatial- or temporal-frequency of scattered seismic waves at each point may be imaged. In still other cases, the seismic propagation velocity or seismic propagation attenuation may be used as a seismic attribute.

Although described for convenience above as a linear sequence of steps, a person of ordinary skill in the art will understand that each step of the seismic processing chain is subject to review and quality control (QC) steps of an automatic, statistical, and/or manual nature. For this reason, among others, some seismic processing steps may be repeated immediately or at a later point in the sequence, to produce an improved, refined, or updated result. For example, the seismic velocity model may be updated after an initial migration has been performed. Similarly, additional temporal-frequency filtering may be inserted into the sequence at numerous points.

Several of these steps, such as seismic imaging and seismic attribute attenuation, require further interpretation to identify the locations within the subsurface at which hydrocarbon accumulations may be present. In some embodiments, the interpretation may occur after the generation of a post-stack seismic image or the seismic attribute. In other embodiments, the interpretation may be performed in parallel or interleaved or integrated into the process of determining the post-stack seismic image or the seismic attribute. Seismic interpretation will be discussed in more detail later.

Many seismic processing methods assume that the seismic data they receive as input contain only signals that have reflected once in the subsurface. However, as noted earlier, seismic waves may reflect multiple times between the seismic source (106) and the seismic receivers (120). FIGS. 2A and 2B show schematic representations of seismic ray-paths in accordance with one or more embodiments. Specifically, FIG. 2A shows a schematic representation of a seismic wave propagating downward from a seismic source (106). The downward-propagating seismic wave (202) may cross several geological discontinuities, such as seismic reflectors (204a, 204b). At each of these geological discontinuities, the downward-propagating seismic wave (202) may generate an upward-propagating reflection ("primary reflection"), such as primary reflections (206a, 206b). The primary reflections (206a, 206b) each contain a portion of the energy from the downward-propagating seismic wave (202).

Upward-propagating primary reflections may also cross geological discontinuities, generating a new downward-propagating seismic wave. This effect is shown in the example in FIG. 2A, where primary reflection (206b) passes through seismic reflector (204a), generating downward-propagating seismic wave (208). Analogously, other primary reflections (not shown) may generate downward-propagating seismic waves at each geological discontinuity, but for clarity of display these combinations are not shown.

Continuing along the ray-path of downward-propagating seismic wave (208) in FIG. 2A, the seismic wave may once again cross a geological discontinuity, such as seismic reflector (204b), where an upward-propagating seismic wave (210) may be generated. It should be noted that upward-propagating seismic wave (210) is the product of multiple reflections. Seismic waves such as upward-propagating seismic wave (210) may then be recorded by seismic receivers (120) at the surface (116) and are frequently referred to as "multiple reflections," or simply "multiples." Further, the upward-propagating seismic wave (210) may be referred to as an "interbed multiple."

Multiples may be divided into two types depending on where the downward reflection occurs. For "surface multiples" the downward reflection occurs at the surface (116) of the earth. Further, the order of a multiple refers to the number of downward reflections from the surface (e.g., "a first-order multiple" has a single downward reflection," and a "second-order multiple" has two downward reflections). For "internal multiples" or "interbed multiples," the downward reflection occurs at a geological interface below the free surface, such as seismic reflector (204a). A person of ordinary skill in the art may use internal multiple and interbed multiple synonymously and, although the term interbed is used herein, the scope of the present disclosure should be interpreted to include both interbed multiples and internal multiples.

Surface multiples may be distinguished from primary reflections and may be partially or completely removed from seismic datasets more easily than interbed multiples. This is partially due to surface multiples being recorded by seismic receivers (120) at the point at which the downward-propagating reflection is generated; that is, at the surface of the earth (116). Interbed multiples such as upward-propagating seismic wave (210) are typically not recorded at the point at which they are reflected downward, i.e., at seismic reflector (204a). Multiple energy typically interferes with primary energy especially in deeper areas of interest for hydrocarbon exploration.

FIG. 2B depicts the erroneous results that arise when input seismic data contains primary reflections and multiple reflections, but seismic processing methods assume the input seismic data contains only primary reflections. While primary reflection (206a) generates an image of seismic reflector (204a), and primary reflection (206b) generates an image of seismic reflector (204*b*), the multiple reflection (upward-propagating seismic wave (210)) is erroneously back-propagated (212) below seismic reflector (204*b*) to generate an erroneous seismic reflector (204*c*) in the seismic image. Such erroneous seismic reflectors may be misinterpreted as real seismic reflectors and/or may obscure real seismic reflectors. It is therefore desirable to remove multiple events from the seismic data as part of the processing flow, before generating a seismic image for interpretation of the subsurface.

The amplitude of both primary reflections and multiple reflections depend in part on the reflection coefficient of the seismic reflectors (e.g., 204*a* and 204*b* in FIG. 2A) from which they are generated. Typically, a reflection coefficient lies in the range of 0-0.25 (excluding cases where larger offsets may generate refracted seismic waves (110) and the reflection coefficient may approach 1). Thus, an interbed multiple that experiences a reflection at each of two seismic reflectors may frequently be much smaller in amplitude than the amplitude of the primary reflections from seismic reflectors. As a result, it is common for one of ordinary skill in the art to distinguish seismic reflectors that are likely to generate significant multiples based on their large primary reflection amplitudes. For example, surface multiples may be predicted (or modeled) using the surface reflector (e.g., the surface of the earth) and interbed multiples may be predicted by identifying strong subsurface reflectors, or multiple "generators."

Multiple prediction, or multiple modeling, is typically the initial step of a multi-step process for multiple attenuation or removal. A predicted multiple model, (or simply "multiple model"), may be generated using data-driven multiple prediction techniques. These techniques may be used to model interbed and surface multiples, including two-dimensional (2D) and three-dimensional (3D) methods. For surface multiples, as part of the surface-related multiple elimination (SRME) technique, surface related multiples are first predicted by convolving the seismic data with successive estimates of the primaries in a recursive estimation process. While SRME may be highly effective in deeper water marine seismic surveys, shallow water seismic data may require additional techniques due, in part, to strong overlapping high-order multiples generated from the surface layer.

For example, model-based water-layer de-multiple (MWD) is a technique specifically designed to predict and attenuate multiples in shallow water. The technique focuses on water-layer multiples and may be applied to the seismic data in conjunction with SRME or other multiple attenuation techniques.

Other more primitive multiple attenuation techniques may be implemented to generate a multiple model, such as methods that discriminate between primary and multiple events based on seismic event dip or moveout (e.g., f-k filters or radon-based methods). Deconvolutional methods may also be used to predict and remove reverberation patterns (i.e., multiple reflections) within the seismic data. Interbed multiples, however, have similar moveout, dip, frequency, and amplitude to primaries, reducing the effectiveness of traditional multiple attenuation methods.

Data-driven surface-related multiple prediction techniques may be extended to include interbed multiples, such as wave-equation based methods derived from the work of Jakubowicz (Jakubowicz H. "Wave equation prediction and removal of interbed multiple" 68*th Annual International Meeting, SEG, Expanded Abstracts,* 1527-1530 (1998)). These methods aim to predict the internal multiples by convolving and correlating the reflection response with itself, however some limitation may exist as these methods may only predict interbed multiples associated with a single seismic reflector (i.e., generator), therefore introducing bias and the risk of not correctly capturing all interbed multiple generators.

The Jakubowicz method may involve manually picking a seismic reflector (i.e., a seismic horizon) within a 3D volume. Interbed multiples with upward-propagating reflections that occur below the seismic horizon of interest may be modeled using this technique. The identification of more than one internal multiple generator (i.e., seismic horizon) may be required, and the method may be implemented in separate passes. However, multiples with all upward-propagating reflections occurring below a given seismic horizon (especially deeper seismic horizons) are typically weaker than multiples that have upward-propagating reflections occurring both above and below the seismic horizon, due to the absorption of seismic energy, which increases with depth. It is therefore desirable to predict the stronger interbed multiples, which have upward-propagating reflections occurring both above and below the seismic horizon of interest.

Marchenko-based equation methods also require a seismic horizon of interest, splitting the subsurface into two parts: shallow (overburden) region and the deep (target) region (Joost van der Neut et al. "Adaptive overburden elimination with the multidimensional Marchenko equation" *Geophysics,* Vol. 81, No. 5, P. T265-284 (September-October 2016)). In Marchenko-based multiple prediction, the overburden is considered as a whole and does not require the identification of individual multiple generators for use in separate passes. All interactions of multiples within the overburden may be modeled, including strong interbed multiples with upward-propagating reflections occurring both above and below the seismic horizon of interest. That is, interbed multiples of all orders at any desired depth within the subsurface may be predicted without having to resolve overlying (overburden) layers first.

The preceding discussion of multiple modeling methods are by no means meant to limit the present disclosure, and any method known to one of ordinary skill in the art may be used to generate a predicted multiple model for use in multiple attenuation or removal.

FIGS. 3A and 3B show examples of seismic data in accordance with one or more embodiments. Specifically, FIGS. 3A and 3B show synthetic seismic data sorted and grouped into a shot gather, with horizontal axis (302) representing offset increasing in opposite directions from a central location (304), and vertical axis (306) representing increasing time. The amplitude of the seismic data is represented using a gray scale, where gray indicates low or zero amplitude, white or light gray indicates positive amplitude, and black or dark gray indicates negative amplitude. FIG. 3A shows synthetic data representing recorded data, which includes both primary events and recorded multiple events.

FIG. 3B shows the predicted multiple events based on the synthetic data in FIG. 3A. The predicted multiple model in this example is generated using a Marchenko-based multiple prediction method. While Marchenko predictions for synthetic data may have the correct amplitude and phase in principle, minor amplitude and phase differences between the predicted multiples and recorded multiples may be present. This can be due to amplitude approximations during convolutional modeling that may not account for amplitude loss (e.g., amplitude absorption as the seismic wave travels through the earth), or source wavelet squaring (i.e., convolving two traces, each with their own source wavelet). In some cases an amplitude mismatch may be due to to imperfect acquisition or pre-processing. That is, subtracting a predicted multiple model directly from the recorded data may not produce a desirable de-multiple result. Multiple energy may not be fully subtracted, or multiple energy may be inversely added to the recorded data.

While some multiple attenuation methods can separate multiple energy from primary energy without generating a multiple model, methods that do generate a multiple model require a second step for separating multiple energy from primary energy, e.g., subtraction of the multiple model from the seismic data. In some cases, a direct subtraction may suffice; however, depending on the method used, the multiple model may contain more multiple energy than the recorded seismic data itself, and/or the predicted multiples may not have the same phase, amplitude, timing, or frequency content as the recorded multiples. In these cases, a direct subtraction may not accurately remove multiples and an "adaptive subtraction" may be required.

Adaptive subtraction is commonly used to subtract a predicted noise model from seismic data. For multiple attenuation, the predicted multiple model is adapted, or filtered, to fit the recorded multiple before performing a subtraction using the adapted, or "filtered multiple model." Specifically, adaptive subtraction may estimate matching filters that eliminate mismatches between predicted multiples and recorded multiples in a series of overlapping data windows. A set of matching filters may be generated so that, once convolved with each seismic trace of the predicted multiple model, may generate a filtered multiple model. The filtered multiple model may then contain estimated multiple energy that matches the recorded multiple.

In some embodiments, a recorded seismic dataset $s(t, x)$, containing recorded primary energy $p(t, x)$ and recorded multiple energy $m(t, x)$, may be written as:

$$s(t, x) = p(t, x) + m(t, x), \qquad \text{Equation (1)}$$

where $t \in \mathbb{R}^{nt}$ and $x \in \mathbb{R}^{nx}$ denote time and space (e.g., a seismic trace), respectively, and $nt$ and $nx$ are their respective dimensions. Various methods known to those ordinarily skilled in the art may be used to estimate a set of matching filters that match the predicted multiple energy $\tilde{m}(t, x)$ to the recorded multiple energy $m(t, x)$. For example, the multi-channel least-square adaptive subtraction method may be used to estimate a set of matching filters using sliding Gaussian windows. That is, a matching filter $f_w(t)$ for window $w$ may be determined by solving the following cost function:

$$\min_{f_w(t)} \|s_w(t, x) - f_w(t) * \tilde{m}_w(t, x)\|_2^2, \qquad \text{Equation (2)}$$

where $*$ represents convolution, $s_w(t,x) \in \mathbb{R}^{wt \times wx}$ and $\tilde{m}_w(t, x) \in \mathbb{R}^{wt \times wx}$ are the recorded seismic data and the predicted multiples in sliding window $w$, and $wt$ and $wx$ are the window dimensions in time and space (e.g., number of seismic traces), respectively. For each sliding window $w$, the filter $f_w(t) \in \mathbb{R}^{nf \times 1}$ may have length $nf$. Although Equation (2) is shown using the $L^2$-norm, the cost function may include other functions, such as the $L^1$-norm or a hybrid $L^1/L^2$-norm. The matching filter may use the least-squares criterion to design convolutional filters $f_w(t)$ that minimize the power in a selected window for the desired multiple-free output $s_w(t, x)$.

The sliding window may be 2D or 3D and may require parameterization such as window dimensions (in space and time) and window overlap percentage. Adaptive subtraction may be applied in multiple passes; that is, a first pass may be applied to compensate for systematic errors or "global" errors in amplitude or phase using large window definitions (e.g., encompassing an entire seismic gather). Once the predicted multiple model is adapted in the first pass, the adapted model may undergo a second pass of adaptation, using smaller cascaded windows intended to solve for localized errors.

In further embodiments, it may be desirable to separate both the recorded seismic data and predicted multiple model into various frequency bands to determine frequency-dependent matching filters. For example, smaller windows may be defined for higher frequencies than for lower frequencies. In some embodiments, the derivation of matching filters may be performed in various sort domains, such as common offset, or common channel, and further, matching filters may be derived from transformed seismic data, such as seismic data transformed into the curvelet domain. Additionally, as there are various methods to predict multiple energy, more than one predicted multiple model may be used in the adaptive subtraction, (e.g., multi-model adaptive subtraction).

As adaptive subtraction is a windowed process, when primary energy and multiple energy overlap or lie within the same window, an estimation error may occur under the energy minimization constraint of Equation (2). That is, multiple energy may not be adequately removed, or primary energy may be unintentionally distorted after subtraction. In some embodiments, in order to maximize multiple energy removal while preserving primary energy, the derived matching filters may be manipulated (i.e., enhanced) before subtraction. For example, in Equation (2), if the Gaussian window step is set to one, giving $nt \times nx$ windows, the set of matching filters may be stored in a non-stationary cube, denoted $F(\tau, t, x) \in \mathbb{R}^{nf \times nt \times nx}$, where $\tau_i$ are filter coefficients, or "slices."

To improve the preservation of primary energy during multiple attenuation, the set of matching filters derived from the adaptive subtraction process may be further constrained by the structure of the predicted multiple. Specifically, the filters may be enhanced using the structure of the predicted multiples by applying structure-oriented smoothing to the filter cube $F(\tau, t, x)$. The structure of the predicted multiple may be extracted, then structure-oriented smoothers derived from the extracted structure may be applied to $F(\tau, t, x)$ for each $\tau$ slice. The structure tensor is commonly used to estimate the orientation of 2D structural features in seismic processing. The structure tensor $T$ for each seismic data sample may be written as:

$$T = \langle g, g^T \rangle = \begin{bmatrix} \langle g_1, g_1 \rangle & \langle g_1, g_2 \rangle \\ \langle g_2, g_1 \rangle & \langle g_2, g_2 \rangle \end{bmatrix}. \qquad \text{Equation (3)}$$

Matrix $T$ may be decomposed into eigenvalues and eigenvectors (i.e., via eigen decomposition) in order to estimate the orientation of each seismic data sample. In general, the eigenvector corresponding to the larger eigenvalue may be perpendicular to the local structure, whereas the eigenvector corresponding to the smaller eigenvalue may be parallel to the local structure. Therefore, to generate the tensor field, D, the larger eigenvalue may be set to 0 and the smaller eigenvalue to 1.

The structure-oriented smoothed filter cube $SF(\tau,t,x)$, containing structure-oriented matching filters, may then be determined from the anisotropic diffusion equation (for a fixed $\tau_0$):

$$SF(\tau_0, t, x) - \alpha Div(D\nabla SF(\tau_0, t, x)) = F(\tau_0, t, x), \qquad \text{Equation (4)}$$

where $\alpha$ is the smoothing parameter, Div is the divergence, and $\nabla$ is the gradient operator. Equation (4) may be solved for each $\tau$ slice.

Using the set of structure-oriented matching filters in $SF(\tau, t, x)$, the filtered or estimated multiple $\hat{m}(t, x)$ may then be written as:

$$\hat{m}(t, x) = \sum_{\tau=-\frac{nf}{2}}^{\frac{nf}{2}} SF(\tau, t, x) \cdot \hat{m}(t, x), \qquad \text{Equation (5)}$$

and the corresponding estimated primary may then be written as:

$$\hat{p}(t, x) = s(t, x) - \hat{m}(t, x). \qquad \text{Equation (6)}$$

FIGS. 4A and 4B show examples of matching filters in accordance with one or more embodiments. In both FIGS. 4A and 4B, the vertical axis (402) represents time (t), the first horizontal axis (404) represents offset (i.e., space (x)) increasing in opposite directions from a central location (406), and the second horizontal axis (408) represents increasing filter coefficient (i) number. FIG. 4A shows three z slices (410a, 410b, and 410c) of a filter cube $F(\tau, t, x)$ containing a set least-square matching filters estimated from the shot gather in FIG. 3A and its corresponding predicted multiple in FIG. 3B. The value or amplitude of each filter coefficient is represented using a gray scale, where light gray indicates low or zero amplitude, white indicates positive amplitude, and black indicates negative amplitude.

FIG. 4B shows three z slices (412a, 412b, and 412c) of a structure-oriented smoothed filter cube $SF(\tau, t, x)$ containing a set of structure-oriented matching filters generating using Equations (3) and (4), and the filter cube $F(\tau, t, x)$ from FIG. 4A. One of ordinary skill in the art would appreciate that the $\tau$ slices (412a, 412b, and 412c) from the set of structure-oriented matching filters are structurally-smoothed versions of the $\tau$ slices (410a, 410b, and 410c) from the set of matching filters in FIG. 4A.

FIG. 5 shows a flowchart in accordance with one or more embodiments. In step 502 of flowchart (500), a seismic dataset for a subterranean region (102) is obtained, in accordance with one or more embodiments. The seismic dataset may include a plurality of recorded multiple events and may be acquired via a seismic survey (100) using a seismic acquisition system. The seismic survey may be conducted on a terrestrial surface, i.e., the seismic survey may be a "land" seismic survey.

In step 504, a predicted multiple model is generated using a multiple prediction method and the seismic dataset, in accordance with one or more embodiments. The predicted multiple model may include a plurality of predicted multiple events. The predicted multiple model may be generated using any method known to one ordinarily skilled in the art. For example, the multiple prediction method may be a Marchenko-based multiple prediction method. In some embodiments, the predicted multiple model may include interbed multiple energy.

In step 506, a set of initial matching filters is estimated using a matching method, in accordance with one or more embodiments. The set of initial matching filters may match the plurality of predicted multiple events to the plurality of recorded multiple events. In some embodiments, the matching method may be a least-square matching method. That is, the set of initial matching filters may be a set of least-square matching filters. Further, the set of initial matching filters may be stored in a non-stationary cube $F(\tau, t, x)$.

In step 508, in accordance with one or more embodiments, a tensor field is generated based, at least in part, on the predicted multiple model. The tensor field may be generated using a 2D structure tensor. That is, the tensor field may describe the distribution of the gradient surrounding a seismic data sample the be generated using Equation (3) and eigen decomposition. In other embodiments, the tensor field may be generated using a 3D structure tensor.

In step 510, in accordance with one or more embodiments, a set of structure-oriented matching filters is determined based, at least in part, on the set of initial matching filters and the tensor field. The set of initial matching filters may be smoothed using the structural information of predicted multiple energy from the tensor field. In some embodiments, determining the set of structure-oriented matching filters may include solving an anisotropic diffusion equation, such as Equation (4). The set of structure-oriented matching filters may be stored in a non-stationary cube $SF(\tau, t, x)$.

In step 512, in accordance with one or more embodiments, a filtered multiple model is generated based, at least in part, on the predicted multiple model and the set of structure-oriented matching filters. The filtered multiple model may be generated using Equation (5) and may include a plurality of estimated multiple events.

In step 514, in accordance with one or more embodiments, a multiple-attenuated seismic dataset is generated based, at least in part, on the filtered multiple model and the seismic dataset. The multiple-attenuated seismic dataset may be generated using Equation (6) and may include a plurality of estimated primary events. That is, subtracting the filtered multiple model from step 512 from the recorded seismic dataset from step 502 may yield a multiple-attenuated seismic dataset. An example of a multiple-attenuated dataset (i.e., its estimated primary events and estimated multiple events) is shown in FIGS. 6A-6D.

Figures 6A, 6B, 6C, 6D:
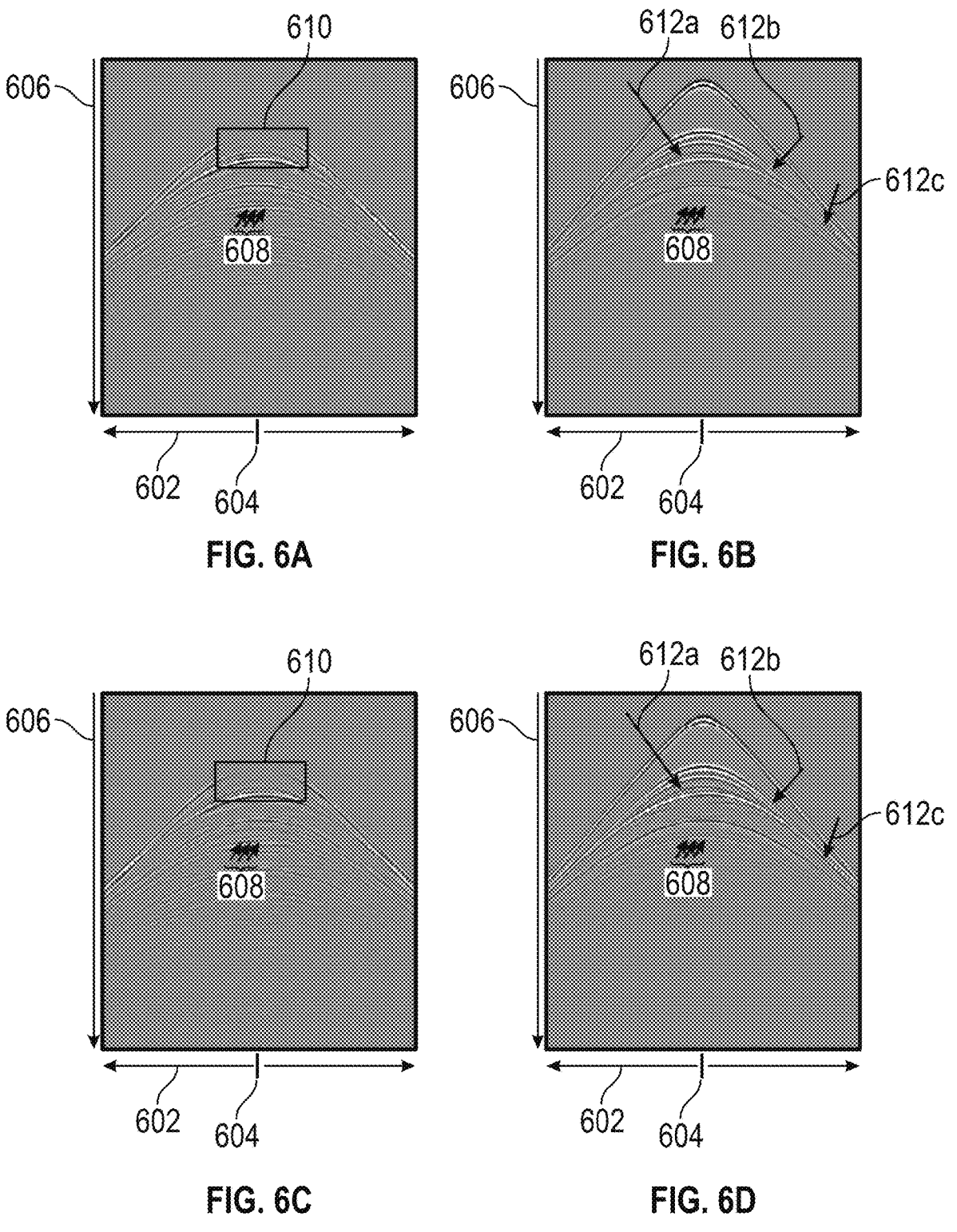

FIGS. 6A-6D show examples of seismic data in accordance with one or more embodiments. Specifically, FIGS. 6A-6B show multiple attenuation results on a shot gather, where the horizontal axis (602) represents offset increasing in opposite directions from a central location (604), and vertical axis (606) representing increasing time. The amplitude of the seismic data is represented using a gray scale, where light gray indicates low or zero amplitude, white indicates positive amplitude, and black indicates negative amplitude. The multiple attenuation results shown in FIGS. 6A-6D are generated using the synthetic shot gather in FIG. 3A ("input") and the predicted multiple model ("predicted multiple") in FIG. 3B.

FIG. 6A shows the filtered multiple model containing estimated multiple events $\hat{m}'$; that is, the predicted multiple m̂ convolved with the set of least-square matching filters F from FIG. 4A. The least-square estimated multiple m̂' is subtracted from the input s and produces the least-square estimated primaries p̂' in FIG. 6B. The three arrows (608) in FIGS. 6A and 6B indicate an area where multiple events overlap primary events, which, as previously discussed, may be a challenging area for windowed adaptive subtraction. A structure-oriented filtered multiple model may reduce primary damage and improve multiple removal over a traditional least-square filtered multiple model.

FIG. 6C shows the structure-oriented filtered multiple model containing estimated multiple events m; that is, the predicted multiple model m convolved with the set of structure-oriented matching filters SF from FIG. 4B. The structure-oriented estimated primaries P in FIG. 6D are generated during the adaptive subtraction process by subtracting the structure-oriented estimated multiple m̂ from the input s.

When comparing FIGS. 6A and 6C, one of ordinary skill in the art would appreciate that the multiple energy inside the box (610) is not as continuous in FIG. 6A as it is in FIG. 6C. This may indicate an estimation error for sliding windows in and around the box (610), and further, that multiple energy may be more effectively removed in FIG. 6D than in FIG. 6B. Additionally, the seismic events indicated by the three arrows (608) have different amplitude characteristics in FIG. 6A and FIG. 6C, which will yield different results after subtraction (i.e., FIGS. 6B and 6D).

Comparing the events indicated by the three arrows (608) in FIGS. 6B and 6D, one of ordinary skill in the art will recognize that the primary event is better preserved in FIG. 6D than in FIG. 6B. Further, each of the three primary events indicated by arrows (612a, 612b, and 612c) show better continuity in FIG. 6D than in FIG. 6C, indicating that the subtraction result of FIG. 6D preserves more primary energy than the result of FIG. 6B. To summarize, in this example, primary energy is better preserved and multiple energy is more effectively removed when using structure-oriented matching filters compared to using least-square matching filters. Thus, this example illustrates—the present disclosure is a solution to the problem of estimating the amplitude of predicted multiples that provides an improvement over available methods for achieving the same known to those skilled in the art.

This improvement may reduce the risk of damaging primary energy during multiple attenuation, which, in turn, reduces the risk of distorting or removing real seismic reflectors. Primary energy preservation and noise reduction (e.g., multiple attenuation) are fundamental to processing a recorded seismic dataset and may impact the resulting seismic image.

Returning to flowchart (500), in step 516, in accordance with one or more embodiments, a seismic image is formed. The seismic image is formed based, at least in part, on the multiple-attenuated seismic dataset. The multiple-attenuated seismic dataset may undergo further pre-processing or may be used to generate a velocity model. Velocity information derived from the multiple-attenuated seismic dataset may be used for migration. In some embodiments, the seismic image may be a migrated seismic image. The migrated seismic image may be further processed, the processing steps typically referred to as "post-processing." Post-processing may include frequency filtering, amplitude balancing, noise attenuation, or dip filtering.

In step 518, in accordance with one or more embodiments, a location of a hydrocarbon reservoir (104) within the subterranean region (102) is determined based, at least in part, on the seismic image. The seismic image or its attributes may be used to determine geological properties in order to locate the hydrocarbon reservoir (104). The process of determining geological properties from a seismic image or seismic attribute image is called seismic interpretation. For example, identifying a discontinuity in an otherwise continuous surface of high amplitude seismic reflections as a geological fault, or identifying a region with anomalously high seismic wave attenuation as indicative of a hydrocarbon gas deposit, are examples of seismic interpretations.

Seismic interpretation may include manual steps, such as "picking" a sparse set of points on a single interpreted undulating geological boundary, and automatic or algorithmic steps, such as picking all the remaining grid points, intervening between the manually picked points, lying on the boundary using the manually picked points as a guide or "seeds."

Often, the output of seismic interpretation includes the seismic image, or attribute image, with the interpretation of labelled geological boundaries, faults, well markers, pore fluid contact levels, gas deposits etc., drawn and annotated on the image. In the past, such interpretation was performed using displays of portions of the seismic image printed on paper with the interpretation drawn, originally hand-drawn, on the paper using colored pen or pencils. Now, a seismic interpreter of ordinary skill in the art will, almost without exception, use a seismic interpretation workstation to perform seismic interpretation.

A seismic interpretation workstation may include one or more computer processors and a computer-readable medium (memory) containing instructions executable by the processor. The computer memory may further contain seismic images and/or seismic attributes. The seismic interpretation workstation may also include a display mechanism, usually one or more monitor screens, but sometimes one or more projector, user-wearable goggles or other virtual reality display equipment and a means of interacting with the display, such as a computer mouse or wand. Further, the seismic interpretation workstation may include dedicated hardware designed to expedite the rendering and display of the seismic image, images, or attributes in a manner and at a speed to facilitate real-time interaction between the user and the data. For example, the seismic interpretation workstation may allow the seismic interpreter to scroll through adjacent slices through a 3D seismic image to visually track the continuity of a candidate geological boundary throughout the 3D image. Alternatively, the seismic interpretation workstation may allow the seismic interpreter to manually control the rotation of the view angle of the seismic image so it may be viewed from above, or from the East or from the West, or from intermediate directions.

As for the seismic interpretation system, the computer processor or processors and computer memory of the seismic interpretation workstation may be co-located with the seismic interpreter, while in other cases the computer processor and memory may be remotely located from the seismic interpreter, such as on "the cloud." In the latter case, the seismic or attribute images may only be displayed on a screen, including a laptop or tablet local to the seismic interpreter, who may interact with the computer processor via instructions sent over a network, including a secure network such as a virtual private network (VPN).

The interpreted seismic image may be used, together with other available information, to determine the location of the hydrocarbon reservoir (104) with a high degree of certainty. Further, the interpreted seismic image may be used to determine locations within a hydrocarbon reservoir (104) for which wellbores may be drilled, safely and economically, to produce the hydrocarbons.

FIG. 7 shows a drilling system (700) in accordance with one or more embodiments. As shown in FIG. 7, a wellbore path (702) may be drilled by a drill bit (704) attached by a drillstring (706) to a drill rig located on the surface (116) of the earth. The drill rig may include framework, such as a derrick (708) to hold drilling machinery. The top drive (710) sits at the top of the derrick (708) and provides clockwise torque via the drive shaft (712) to the drillstring (706) in order to drill the wellbore. The wellbore may traverse a plurality of overburden (714) layers and one or more cap-rock (716) layers to a hydrocarbon reservoir (104) within the subterranean region (102). In accordance with one or more embodiments, the seismic image may be used to plan a well, including a wellbore path, (702) and drill a wellbore (717) guided by the wellbore path (702). The wellbore path (702) may be a curved wellbore path, or a straight wellbore path. All or part of the wellbore path (702) may be vertical, and some wellbore paths may be deviated or have horizontal sections.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the target zone (718), e.g., a targeted hydrocarbon-bearing formation, and a planned wellbore path (702) from the starting location to the terminal location. In other words, the wellbore path (702) may intersect a previously located hydrocarbon reservoir (104).

Typically, the wellbore plan is generated based on best available information at the time of planning from a geo-physical model, geomechanical models encapsulating sub-terranean stress conditions, the trajectory of any existing wellbores (which it may be desirable to avoid), and the existence of other drilling hazards, such as shallow gas pockets, over-pressure zones, and active fault planes.

The wellbore plan may include wellbore geometry information such as wellbore diameter and inclination angle. If casing (724) is used, the wellbore plan may include casing type or casing depths. Furthermore, the wellbore plan may consider other engineering constraints such as the maximum wellbore curvature ("dog-log") that the drillstring (706) may tolerate and the maximum torque and drag values that the drilling system (700) may tolerate.

A wellbore planning system (750) may be used to gen-erate the wellbore plan. The wellbore planning system (750) may comprise one or more computer processors in commu-nication with computer memory containing the geophysical and geomechanical models, information relating to drilling hazards, and the constraints imposed by the limitations of the drillstring (706) and the drilling system (700). The wellbore planning system (750) may further include dedi-cated software to determine the planned wellbore path (702) and associated drilling parameters, such as the planned wellbore diameter, the location of planned changes of the wellbore diameter, the planned depths at which casing (724) will be inserted to support the wellbore and to prevent formation fluids entering the wellbore, and the drilling mud weights (densities) and types that may be used during drilling the wellbore.

A wellbore (717) may be drilled using a drill rig that may be situated on a land drill site, an offshore platform, such as a jack-up rig, a semi-submersible, or a drill ship. The drill rig may be equipped with a hoisting system, such as a derrick (708), which can raise or lower the drillstring (706) and other tools required to drill the well. The drillstring (706) may include one or more drill pipes connected to form conduit and a bottom hole assembly (BHA) (720) disposed at the distal end of the drillstring (706). The BHA (720) may include a drill bit (704) to cut into subsurface (722) rock. The BHA (720) may further include measurement tools, such as a measurement-while-drilling (MWD) tool and logging-while-drilling (LWD) tool. MWD tools may include sensors and hardware to measure downhole drilling param-eters, such as the azimuth and inclination of the drill bit, the weight-on-bit, and the torque. The LWD measurements may include sensors, such as resistivity, gamma ray, and neutron density sensors, to characterize the rock formation surround-ing the wellbore (717). Both MWD and LWD measurements may be transmitted to the surface (116) using any suitable telemetry system, such as mud-pulse or wired-drill pipe, known in the art.

To start drilling, or "spudding in" the well, the hoisting system lowers the drillstring (706) suspended from the derrick (708) towards the planned surface location of the wellbore (717). An engine, such as a diesel engine, may be used to supply power to the top drive (710) to rotate the drillstring (706). The weight of the drillstring (706) com-bined with the rotational motion enables the drill bit (704) to bore the wellbore.

The near-surface is typically made up of loose or soft sediment or rock, so large diameter casing (724), e.g., "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface (116) of the earth.

Drilling may continue without any casing (724) once deeper, or more compact rock is reached. While drilling, a drilling mud system (726) may pump drilling mud from a mud tank on the surface (116) through the drill pipe. Drilling mud serves various purposes, including pressure equaliza-tion, removal of rock cuttings, or drill bit cooling and lubrication.

At planned depth intervals, drilling may be paused and the drillstring (706) withdrawn from the wellbore. Sections of casing (724) may be connected and inserted and cemented into the wellbore. Casing string may be cemented in place by pumping cement and mud, separated by a "cementing plug," from the surface (116) through the drill pipe. The cementing plug and drilling mud force the cement through the drill pipe and into the annular space between the casing and the wellbore wall. Once the cement cures, drilling may recom-mence. The drilling process is often performed in several stages. Therefore, the drilling and casing cycle may be repeated more than once, depending on the depth of the wellbore and the pressure on the wellbore walls from surrounding rock.

Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A drilling system (700) may be disposed at and commu-nicate with other systems in the well environment. The drilling system (700) may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure weight-on-bit, drill rotational speed (RPM), flow rate of the mud pumps (GPM), and rate of penetration of the drilling operation (ROP). Each sensor may be positioned or configured to measure a desired physical stimulus. Drilling may be considered complete when a target zone (718) is reached, or the presence of hydrocarbons is established.

FIG. 8 shows a block diagram of systems (800) in accordance with one or more embodiments. Each system may be coupled to one or more other systems within the series of systems (800). The seismic acquisition system (804) may be configured to record a seismic dataset generated during a seismic survey (100) of a subterranean region (102), as previously described in FIG. 1. The seismic dataset may be physically transferred to the seismic processing system (806) in the form of tape readers or high-capacity hard drives.

The seismic processing system (806) may receive the seismic dataset and may be used to process the seismic dataset. This may include processing steps such as pre-processing, noise attenuation (e.g., multiple attenuation), near-surface corrections, velocity analysis, migration (i.e., imaging), or attribute generation. In some embodiments, the seismic processing system (806) may be used to determine a set of structure-oriented matching filters for use in adaptive multiple subtraction to generate a multiple-attenuated seismic dataset. Further, the seismic processing system (806) may be used to form a seismic image based on the multiple-attenuated seismic dataset. The seismic image may be transferred to a seismic interpretation workstation (808).

The seismic interpretation workstation (808) may be used to determine a location of a hydrocarbon reservoir (104) (or other subterranean features), based on the seismic image.

Knowledge of the location of the hydrocarbon reservoir (104) and other subterranean features may be transferred to a wellbore planning system (750). The wellbore planning system (750) may use information regarding the hydrocarbon reservoir (104) location to plan a well, including a wellbore path from the surface (116) of the earth to penetrate the hydrocarbon reservoir (104).

Information regarding the planned wellbore and wellbore path may be transferred to the drilling system (700) described in FIG. 6. The drilling system (700) may drill the wellbore along the planned wellbore path to access and produce the hydrocarbon reservoir (104).

Systems such as the seismic acquisition system (804), the seismic processing system (806), the seismic interpretation workstation (808), and the wellbore planning system (750), may all include or be implemented on one or more computer systems such as the one shown in FIG. 9.

FIG. 9 shows a computer system in accordance with one or more embodiments. The computer system is used to provide computational functionalities associated with described algorithms, methods, functions, processes, flows, and procedures as described in the present disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a graphical user interface (GUI).

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). For example, a generic computer (902), seismic processing system (806), and seismic interpretation workstation (808) may be communicably coupled using a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application, for example, executing on another computer (902) and responding to the received requests by processing the said requests in an appropriate software application. For example, since seismic processing and seismic interpretation may be not be sequential, each computer (902) system may receive requests over a network (930) from any other computer (902) and respond to the received requests appropriately. In addition, requests may also be sent to the computer (902) from internal users (for example, from a command console or by other appropriate access method), external or third-parties, other automated applications, as well as any other appropriate entities, individuals, systems, or computers.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) also includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) further includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) or a combination of the API (912) and service layer (913). The API (912) may include specifications for routines, data structures, and object classes. The API (912) may be either computer-language independent or dependent and refer to a complete interface, a single function, or even a set of APIs.

The service layer (913) provides software services to the computer (902) or other components (whether illustrated or not) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or submodules of another software module, enterprise application, or hardware module without departing from the scope of this disclosure.

There may be any number of computers (902) associated with, or external to, a computer system containing computer (902), wherein each computer (902) communicates over network (930). For example, one computer system may be specifically configured for seismic processing and denoted the seismic processing system (806). Another computer system may be specifically configured for seismic interpretation and denoted the seismic interpretation workstation (808). In some embodiments, seismic processing, such as steps 504-516 of FIG. 5, may be conducted using a first computer (902) and one or more first applications (907) while seismic interpretation, such as step 518 of FIG. 5, may be conducted on a second computer (902) using one or more second applications (907).

Further, the terms "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as limited only by the scope of the following claims.

What is claimed is:

1. A method, comprising:
   obtaining a seismic dataset for a subterranean region, wherein the seismic dataset comprises a plurality of recorded multiple events;
   generating a predicted multiple model using a multiple prediction method and the seismic dataset, wherein the predicted multiple model comprises a plurality of estimated multiple events;
   estimating a set of initial matching filters using a matching method, wherein the set of initial matching filters matches the plurality of estimated multiple events to the plurality of recorded multiple events;
   generating a tensor field based, at least in part, on the predicted multiple model;
   determining a set of structure-oriented matching filters based, at least in part, on the set of initial matching filters and the tensor field;
   generating a filtered multiple model based, at least in part, on the predicted multiple model and the set of structure-oriented matching filters;
   generating a multiple-attenuated seismic dataset based, at least in part, on the filtered multiple model and the seismic dataset;
   forming a seismic image based, at least in part, on the multiple-attenuated seismic dataset; and
   determining a location of a hydrocarbon reservoir within the subterranean region based, at least in part, on the seismic image.

2. The method of claim 1, further comprising planning a well to penetrate the hydrocarbon reservoir based on the location, wherein the planned well comprises a planned wellbore path.

3. The method of claim 2, further comprising drilling a wellbore guided by the planned wellbore path.

4. The method of claim 1, wherein the predicted multiple model comprises interbed multiple energy.

5. The method of claim 1, wherein the matching method comprises a least-square matching method.

6. The method of claim 1, wherein the multiple prediction method comprises a Marchenko-based multiple prediction method.

7. The method of claim 1, wherein determining the set of structure-oriented matching filters comprises solving an anisotropic diffusion equation.

8. A non-transitory computer-readable medium having computer-executable instructions stored thereon that, when executed by a processor, perform steps comprising:

receiving a seismic dataset for a subterranean region, wherein the seismic dataset comprises a plurality of recorded multiple events;

generating a predicted multiple model using a multiple prediction method and the seismic dataset, wherein the predicted multiple model comprises a plurality of estimated multiple events;

estimating a set of initial matching filters using a matching method, wherein the set of initial matching filters matches the plurality of estimated multiple events to the plurality of recorded multiple events;

generating a tensor field based, at least in part, on the predicted multiple model;

determining a set of structure-oriented matching filters based, at least in part, on the set of initial matching filters and the tensor field;

generating a filtered multiple model based, at least in part, on the predicted multiple model and the set of structure-oriented matching filters;

generating a multiple-attenuated seismic dataset based, at least in part, on the filtered multiple model and the seismic dataset;

forming a seismic image based, at least in part, on the multiple-attenuated seismic dataset; and determining a location of a hydrocarbon reservoir within the subterranean region based, at least in part, on the seismic image.

9. The non-transitory computer-readable medium of claim 8, further comprising planning a well to penetrate the hydrocarbon reservoir based on the location, wherein the planned well comprises a planned wellbore path.

10. The non-transitory computer-readable medium of claim 8, wherein the predicted multiple model comprises interbed multiple energy.

11. The non-transitory computer-readable medium of claim 8, wherein the matching method comprises a least-square matching method.

12. The non-transitory computer-readable medium of claim 8, wherein the multiple prediction method comprises a Marchenko-based multiple prediction method.

13. The non-transitory computer-readable medium of claim 8, wherein determining the set of structure-oriented matching filters comprises solving an anisotropic diffusion equation.

14. A system, comprising:

a seismic acquisition system configured to:

record a seismic dataset for a subterranean region, wherein the seismic dataset comprises a plurality of recorded multiple events;

a seismic processing system configured to:

receive the seismic dataset, generate a predicted multiple model using a multiple prediction method and the seismic dataset, wherein the predicted multiple model comprises a plurality of estimated multiple events, estimate a set of initial matching filters using a matching method, wherein the set of initial matching filters matches the plurality of estimated multiple events to the plurality of recorded multiple events, generate a tensor field based, at least in part, on the predicted multiple model, determine a set of structure-oriented matching filters based, at least in part, on the set of initial matching filters and the tensor field, generate a filtered multiple model based, at least in part, on the predicted multiple model and the set of structure-oriented matching filters, generate a multiple-attenuated seismic dataset based, at least in part, on the filtered multiple model and the seismic dataset, and form a seismic image based, at least in part, on the multiple-attenuated seismic dataset; and a seismic interpretation workstation configured to:

determine a location of a hydrocarbon reservoir within the subterranean region based, at least in part, on the seismic image.

15. The system of claim 14, further comprising a well planning system configured to plan a well to penetrate the hydrocarbon reservoir based on the location, wherein the planned well comprises a planned wellbore path.

16. The system of claim 15, further comprising a drilling system configured to drill a wellbore guided by the planned wellbore path.

17. The system of claim 14, wherein the predicted multiple model comprises interbed multiple energy.

18. The system of claim 14, wherein the matching method comprises a least-square matching method.

19. The system of claim 14, wherein the multiple prediction method comprises a Marchenko-based multiple prediction method.

20. The system of claim 14, wherein determining the set of structure-oriented matching filters comprises solving an anisotropic diffusion equation.

\* \* \* \* \*